(12) United States Patent
Lindquist

(10) Patent No.: US 6,372,276 B1
(45) Date of Patent: Apr. 16, 2002

(54) METHOD FOR PRODUCING STERILE, STABLE MILK

(75) Inventor: Anders Lindquist, Helsingborg (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/709,419

(22) Filed: Nov. 13, 2000

Related U.S. Application Data

(63) Continuation-in-part of application No. 09/446,270, filed as application No. PCT/SE98/01145 on Mar. 29, 2000, now Pat. No. 6,326,044, which is a continuation-in-part of application No. 09/380,833, filed as application No. PCT/SE98/00413 on Dec. 2, 1999, now abandoned.

(30) Foreign Application Priority Data

Mar. 14, 1997 (SE) .............................. 9700928
Jun. 19, 1997 (SE) .............................. 9702359

(51) Int. Cl.[7] .................................. A23C 9/00
(52) U.S. Cl. ................................. 426/522; 426/491
(58) Field of Search ...................... 426/521, 522, 426/511, 491, 495

(56) References Cited

U.S. PATENT DOCUMENTS

| 3,233,964 A | | 2/1966 | Skoldberg | |
|---|---|---|---|---|
| 3,973,048 A | | 8/1976 | Sollerud | |
| 3,983,257 A | * | 9/1976 | Malmberg et al. | .......... 426/491 |
| 4,175,141 A | | 11/1979 | Adams, Jr. et al. | |

(List continued on next page.)

FOREIGN PATENT DOCUMENTS

| GB | 2209919 A | | 5/1989 | |
|---|---|---|---|---|
| WO | WO96/01687 | | 3/1986 | |
| WO | WO87/05469 | * | 9/1987 | ................. 426/522 |
| WO | WO94/26121 | | 11/1994 | |
| WO | WO96/08155 | | 3/1996 | |
| WO | WO96/36238 | | 11/1996 | |
| WO | WO97/49295 | | 12/1997 | |
| WO | WO98/02047 | | 1/1998 | |
| WO | WO98/41102 | | 9/1998 | |
| WO | WO 98/57549 | | 12/1998 | |

OTHER PUBLICATIONS

"8. Alternative Methods: Legal and Control Aspects" H. Glaeser, European Commission, Heat Treatments & Alternative Methods, Processing of the IDF Symposium held in Vienna (Austria) Sep. 6–8, 1995, pp. 438–447.
"Filter Out Bacteria", Dairy Foods® Mar. 1996, p. 55.
"Psychotrophs in Dairy Products: Their Effects and Their Control" Claude P. Champagne et al., Critical Reviews in Food Science and Nutrition, vol. 34, Issue 1, 1994, pp. 1–30.
"Dairy Technology", Food Science and Technology, Research Report 1988–89, pp. 96–105.

*Primary Examiner*—George C. Yeung
(74) *Attorney, Agent, or Firm*—Burns, Doane, Swecker & Mathis, L.L.P.

(57) ABSTRACT

This invention is a method of producing a stable, sterile milk fraction comprising filtering a portion of raw milk, sterilizing the filter permeate at a temperature of from about 78° C. to about 121° C., stabilizing the sterile permeate at a temperature of from about 50° C. to about 121° C., and deactivating enzymes at a temperature of from about 50° C. to about 78° C. The stable, sterile milk fraction and milk products made therefrom have an improved flavor and a shelf life of at least about one month, preferably at least about three months, under ambient conditions. The sterile, stable milk fraction is free of heat resistant bacteria; is free of, or has a reduced number of, thermoduric bacteria; and has a reduced number of heat sensitive bacteria as compared to the raw milk portion.

50 Claims, 5 Drawing Sheets

U.S. PATENT DOCUMENTS

| | | |
|---|---|---|
| 4,340,479 A | 7/1982 | Pall |
| 4,515,823 A | 5/1985 | Kirshenmann |
| 4,560,567 A | 12/1985 | Rausing |
| 4,853,246 A | 8/1989 | Stevens |
| 4,876,100 A | 10/1989 | Holm et al. |
| 4,894,243 A | 1/1990 | Ahrné |
| 4,931,302 A | 6/1990 | Leshik et al. |
| 5,137,738 A * | 8/1992 | Wynn .................. 426/491 |
| 5,256,437 A | 10/1993 | Degen et al. |
| 5,338,553 A | 8/1994 | Johnson et al. |
| 5,356,651 A | 10/1994 | Degen et al. |
| 5,401,523 A | 3/1995 | Degen et al. |
| 5,576,040 A | 11/1996 | Moller et al. |
| 5,679,780 A | 10/1997 | Jensen et al. |
| 5,683,733 A | 11/1997 | Krabsen et al. |
| 5,935,632 A | 8/1999 | Larsen |

\* cited by examiner

METHOD FOR PRODUCING STERILE, STABLE MILK

RELATED APPLICATIONS

This application is a continuation-in-part of related application U.S. Ser. No 09/380,833, filed Dec. 2, 1999, now abandoned, corresponding to PCT/SE98/00413, filed Mar. 9, 1998 WO 98/41102, and a continuation-in-part of related application U.S. Ser. No. 09/446,270, filed Mar. 29, 2000 now U.S. Pat. No. 6,326,044, corresponding to PCT/SE98/01145, filed Jun. 15, 1998 WO 98/57549, each of which is hereby incorporated by reference in its entity.

BACKGROUND OF THE DISCLOSURE

1. Field of the Invention

The invention relates to a method for producing a sterile, stable milk product with improved flavor capable of storage under ambient conditions, wherein sterility and stability of a milk fraction within the milk product is obtained using a combination of filtration and heat treatment of a raw milk portion.

2. Background

One of the greatest causes of economic loss of refrigerated foods is microorganisms, in particular psychrotrophs, and their enzymes. Psychrotrophic microorganisms flourish at temperatures which are typically used for food refrigeration, between about 0° C. and about 15° C. Heat treatments, such as pasteurization or sterilization, can kill most or all of these unwanted microorganisms and thus enhance the shelf-life of foods. However, enzymes produced by these microorganisms prior to heat treatment, as well as natural enzymes present in food even after pasteurization and/or sterilization, can provide a more intractable problem because many of these enzymes are markedly heat stable. Thus, these enzymes can cause subsequent spoilage even in a sterile food product, wherein all microorganisms are inactivated, dead or removed. This problem is of particular concern to the dairy industry for products stored at room, or ambient, temperature, where enzymatic activity is increased as compared to cold storage, which inhibits or significantly reduces enzymatic activity.

Traditionally, milk products including, for example, whole milk, 2% milk, skim milk, yogurt and cottage cheese have been stored, transported and sold in cold conditions, typically from about 4° C. to about 8° C., in order to prevent spoilage of the milk product due to microorganism growth. Despite the cold storage, certain microorganisms, in particular psychrotrophic bacteria, thrive, leading to milk product spoilage in a relatively short time, usually within several weeks.

Freshly drawn milk is likely to contain psychrotrophic bacteria contracted from milk handling equipment such as storage tanks and pipework, in addition to naturally occurring microorganisms which may include bacteria, mold and yeast. Psychrotropic bacteria have the ability to multiply relatively quickly at low storage temperatures, about 4° C., which are employed by the dairy industry for raw milk. Such milk may be stored for up to 3 days at these temperatures before processing at the dairy. During this storage period, the psychrotrophs, and particularly Pseudomonas spp., can multiply to fairly high numbers, typically up to 10 million bacteria per milliliter of milk. This growth is accompanied by the production of extracellular enzymes. The extracellular enzymes, in particular proteases, attack milk proteins and produce breakdown products having a bitter taste. These enzyme activities are temperature dependent and increase with increasing temperatures.

Due to the speed at which microorganisms multiply, raw milk has a very short shelf life. The shelf life of milk is drastically reduced by the activity of the naturally occurring enzymes and enzymes produced by microorganisms present in the milk. This is true even in milk treated to reduce the number of microorganisms because some extracellular enzymes will be present in the milk before treatment intended to kill or inactivate such microorganisms can occur. Thus, it is essential that milk be conveyed quickly and while cold in order to minimize enzymatic activity.

The need for speed in conveying milk and milk-containing products to market is great because increasingly each step of milk processing to achieve consumer ready milk or milk products is done by a different entity. Thus, each milk product is transported and stored several times between drawing raw milk at the farm and placement of the milk product on the shelf at the local store. Each transport or storage is another period in which the milk or milk product may experience temperature fluctuation, and is another period during which microorganism growth and milk or milk product spoilage can occur.

An example of milk processing for cold storage milk is described in U.S. Pat. No. 5,935,632, corresponding to WO 96/36238. U.S. Pat. No. 5,935,632 describes a process of treating milk wherein the milk is separated into cream and skimmed milk portions. The skimmed milk is filtered with a filter of 0.05–2.0 $\mu$m and then optionally treated at 50–72° C. for up to 15 seconds. The milk is then pasteurized by heating to 70–85° C. for 2–30 seconds or heating to 85–140° C. for 1–10 seconds. Some of the filtered milk may be remixed with the cream portion and heated with the cream to 120° C. for two seconds and then recombined with the heated and pasteurized milk. This process produces a milk product with an extended shelf life.

In order to reduce milk or milk product spoilage, it is desirable that milk be treated so that it may be handled under ambient conditions for long periods of time without spoilage. Treatment of milk to allow ambient storage and handling would greatly reduce the current costs of milk product production because there would be little or no need for refrigerated trucks or storage units during the production process, and the speed of transport and production would not be as critical. Further, the shelf life of milk products would be increased, thus greatly reducing wasted product.

Sterile milk, or commercially sterile milk, may be defined as a product which is free of microorganisms, such as bacteria and spores, which can grow under the prevailing storage conditions. Sterile milk, packaged under aseptic conditions in aseptic packages, enjoys the advantage of being able to be distributed and stored under ambient conditions for a lengthy period of time.

In order to produce such a commercially sterile milk, milk is commonly treated by UHT (Ultra High Temperature), i.e., treatment of the milk at an elevated temperature, normally from about 135° C. to about 150° C. for about 4 to about 15 seconds. As a result of this heat treatment, microorganisms are killed and enzymes are at least partially inactivated so that the resultant milk product has a shelf-life varying from about 3 to 12 months when stored under ambient conditions.

However, with UHT milk, enzymes, especially proteases, produced by microorganisms before heat treatment are of concern because, to a large extent, original enzyme activity and extracellular enzymatic activity can remain in the milk after UHT treatment. If sufficient enzymes are produced by psychrotrophs in the raw milk before heat treatment, the quality of UHT milk can deteriorate even after treatment, giving rise to degradation of the milk product during storage. Proteases are of especial concern because they can cause spoilage even when present at very low concentrations.

Another drawback inherent in milk treated by the UHT method is that the high temperature imparts a cooked flavor to the milk. The cooked flavor results at least in part from the heat-induced release of sulfhydryl groups in whey proteins, β-lactoglobulin and euglobulin in the milk from the breakage of chemical bonds. See *McGraw-Hill Encyclopedia of Science & Technology*, 6$^{th}$ Ed., Vol. 11, (New York, 1987), p. 206. The degree of cooked flavor will depend on whether the UHT system used is direct or indirect. Direct systems produce a milk with less cooked flavor, but with a shorter shelf life when stored under ambient conditions than milk treated by indirect UHT at the same temperature and for the same amount of time.

Combinations of milk treatment by UHT and a lower temperature process of enzyme deactivation are described, for example, in GB 2209919A and U.S. Pat. No. 4,175,141. The enzyme deactivation can occur before or after UHT treatment, resulting in a sterile, stable milk product with an altered, cooked taste.

GB 2209919A describes a method of deactivating heat-stable enzymes in a nutrient such as milk or juice by subjecting the nutrient to UHT treatment at $\geq 100°$ C. for up to 2 minutes, cooling and holding the nutrient at a temperature of 45–95° C. for 1–10 minutes, and then immediately cooling to less than 35° C. within 5 minutes. The UHT treatment of milk preferably occurs at temperatures of at least 130° C. for 1–10 seconds at a pressure above atmospheric pressure.

U.S. Patent No. 4,175,141 describes the UHT treatment of milk at 120° C. or greater and low temperature treatment at 50–65° C. for at least several minutes, preferably 5–60 minutes, to kill heat resistant proteases. The UHT and heat treatment can occur in any order.

UHT treatment is also known to be used in combination with filtration, as demonstrated in U.S. Pat. No. 6,117,470. This patent discloses filtration of skimmed milk with a filter having a pore size of 0.05–2.0 cm to form a permeate and a retentate. The retentate contains the major portions of fat and casein and is subjected to UHT treatment at 120° C.–165° C. before recombination with the permeate, homogenization and packaging for consumer consumption. This produces a skimmed milk with superior keeping qualities. However, improved flavor is still desirable.

Accordingly, there remains a need in the art to develop a process that provides a sterile milk with both improved flavor and good stability, thereby providing a long shelf life under ambient conditions.

SUMMARY OF THE INVENTION

A means of achieving a sterile, stable milk product with improved flavor capable of storage under ambient conditions, wherein sterility and stability of a milk fraction within the milk product is obtained using a combination of filtration and heat treatment of the raw milk portion, is described.

A method of obtaining a commercially sterile and stable milk product with improved flavor for consumer consumption with varying fat content is also described. The milk product is purer than milk products produced according to prior art methods because the invention provides a sterile and stable milk fraction for use in producing the milk product, wherein the milk fraction is free of heat resistant bacteria; free of, or has a reduced number of, thermoduric bacteria; and has a reduced number of heat sensitive bacteria.

One aspect of the invention is a process for forming a stable, sterile milk fraction wherein a raw milk portion is filtered, sterilized at from about 78° C. to about 121° C., stabilized at from about 50° C. to about 121° C., and enzymes are deactivated at from about 50° C. to about 78° C. The raw milk portion is not heated above 121° C. during the process.

Another embodiment includes separating milk into a cream fraction and a raw milk portion; treating the cream fraction by UHT; filtering the raw milk portion to form a permeate; sterilizing the permeate at from about 78° C. to about 121° C.; stabilizing the sterile permeate at from about 50° C. to about 121° C.; deactivating enzymes in the sterile, stable permeate at from about 50° C. to about 78° C. to form a milk fraction; combining the sterile and stable cream fraction and milk fraction and homogenizing, wherein the raw milk portion is not heated above 121° C. during processing.

Another aspect of the invention is the resultant sterile, stable milk fraction. The milk fraction can be produced by the processes described herein and is free of heat resistant bacteria and has a reduced number of both thermoduric and heat sensitive bacteria. Preferably, the milk fraction is free of heat resistant and thermoduric bacteria and has a reduced number of heat sensitive bacteria. The milk fraction is sterile and stable for at least about one month, preferably at least about two months, and more preferably at least about three months, under ambient conditions.

Another aspect of the invention is the milk product produced from the sterile, stable milk fraction. The milk product has a reduced number of heat resistant bacteria, thermoduric bacteria and heat sensitive bacteria as compared to prior art milk products. The milk product is stable for at least about one month, preferably at least about two months, and more preferably at least about three months, under ambient conditions.

Other aspects and features of the invention will be apparent to practitioners in the art upon review of the entire specification and claims.

BRIEF DESCRIPTION OF THE DRAWING

FIG. 1 is a diagram of a preferred embodiment of a process for forming stable, sterilized milk according to the invention;

FIG. 2 is a diagram depicting direct and indirect heating for sterilization of milk according to the claimed invention;

FIG. 3 is a diagram of a second preferred embodiment of a process for forming stable, sterilized milk according to the invention;

FIG. 4 is a diagram of a third preferred embodiment of a process for forming stable, sterilized milk according to the invention; and FIG. 5 is an alternate diagram of a third preferred embodiment of a process for forming stable, sterilized milk according to the invention.

DETAILED DESCRIPTION OF PREFERRED EMBODIMENTS

Figure 1:
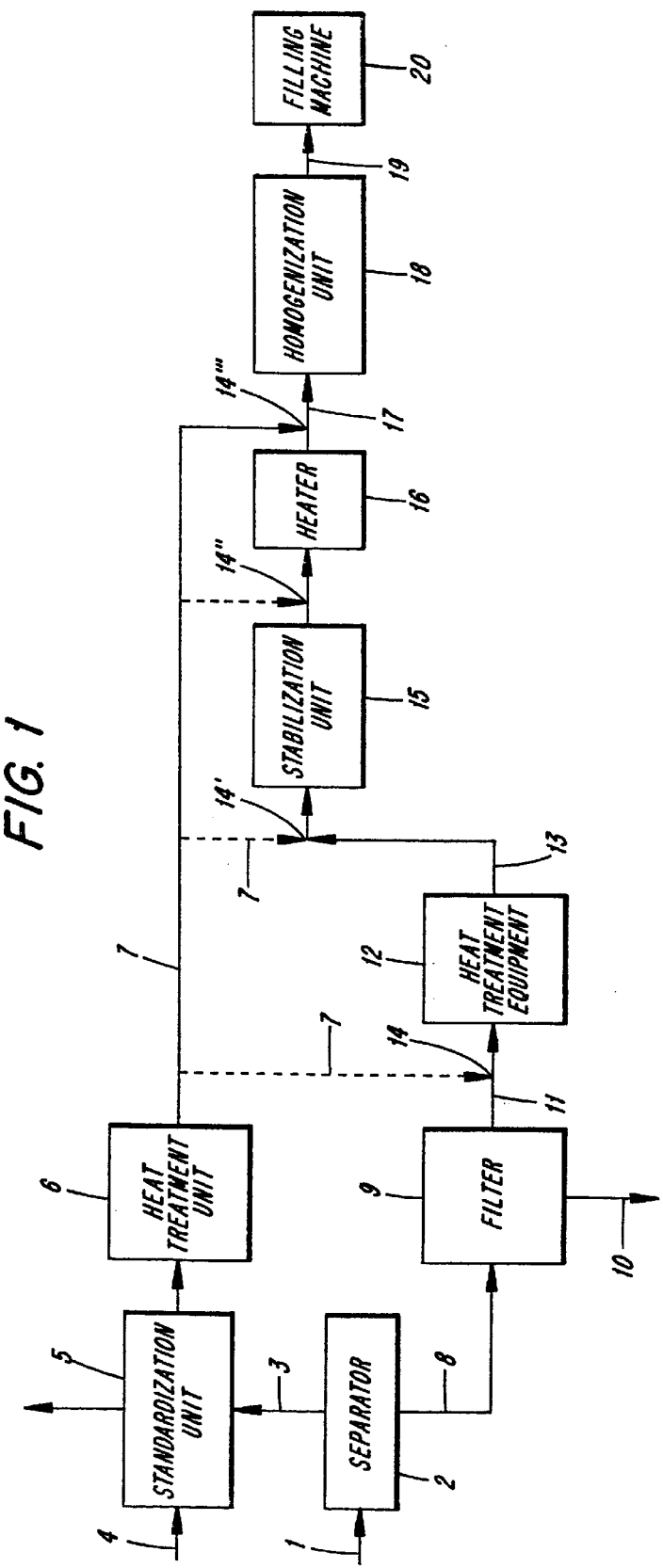
FIGS. 1–5 are representative of the claimed invention. Like portions of figures are identified in the same manner. The Figures are as follows.

A process for providing a sterile, stable milk fraction with an improved flavor is provided herein. In particular, it is desirable that the milk fraction and milk products produced therefrom be able to be stored for a period of several months under ambient conditions without spoiling, as indicated by a change in the taste, smell or texture of the milk fraction or milk product, and by an increase in enzyme breakdown product levels. It has been found that known methods of sterilization do not result in both a good flavor and a long shelf life for milk products stored under ambient conditions.

The combination of known filtration techniques with known heat is treatments, such as pasteurization, does not result in a sufficiently sterile milk product capable of storage under ambient conditions. Known filtration techniques do not remove all microorganisms and enzymes which may cause milk product spoilage under ambient conditions, and pasteurization is not sufficient to deactivate all microorganisms and enzymes remaining after filtration. Thus, the resultant milk product is not stable under ambient conditions for a sufficient period of time. The use of Ultra High Temperature (UHT) treatments, alone or in combination with enzyme deactivation techniques, results in a highly stable milk product with a cooked flavor that is not acceptable to certain consumers.

This invention provides a means of forming a milk fraction and/or milk product which is both stable and sterile and has a shelf life of at least about one month, preferably at least about two months, and more preferably at least about three months, under ambient conditions.

Certain terminology as used herein is specifically defined below. Other terminology is defined elsewhere within the body of the text. Unless otherwise specified, all uses of a particular term are intended to have the meaning set forth herein. Undefined terms have their ordinary meaning as known to practitioners in the art.

"sterile" it is meant an absence of microorganisms capable of multiplying under prevailing storage conditions.

By "stable" it is meant that the milk fraction and/or milk product does not degrade noticeably during a specified time period, wherein degradation is indicated by a change in flavor and/or texture of the milk product, usually accompanied by a change in odor. The degree of degradation can be observed by measuring the amount of enzyme breakdown products, in particular, the presence of breakdown product amino-N, in the stored milk fraction or milk product. For a person with a sensitive palate, it has been found that a noticeable level of degradation can be shown by a measurement of amino-N in the milk fraction or milk product of about 30 mg/L or more. The enzyme breakdown product of amino-N is measured as set forth herein, and as described by Chism, G. W., et al. in *Dairy Science* 62:1798–1800 (1979), and by Rollema et al. in *Milchwissenschaft* 44(8) (1989).

By "shelf life" it is meant the period of time for which the milk product remains stable.

By "raw milk" is meant untreated milk. Raw milk is separated into a cream fraction which is a standardized portion of raw milk having a fat content of between about 12% and about 65%, preferably about 40%, and skim milk having a fat content of from about 0.05% to about 0.15%.

By "raw milk portion" it is meant skim milk or standardized milk with a fat content of at least about 0.05% which will be processed as described herein. Standardized milk is milk comprising a specified amount of fat, usually provided by addition of a portion of the cream fraction to skim milk. The cream fraction and skim milk used in preparing standardized milk can each independently be treated or untreated.

By "permeate" is meant the raw milk portion which has passed through at least one filter.

By "retentate" is meant the raw milk portion retained by at least one filter.

By "milk fraction" it is meant the raw milk portion after processing by the filtration and heating methods described herein.

By "milk product" it is meant a food product comprising the milk fraction.

By "enzyme deactivation" it is meant inhibition or irreversible loss of activity of an enzyme such that it no longer is capable of causing milk degradation.

By "enzyme breakdown product" it is meant residue or products created by enzymatic activity, such as, but not limited to, amino-N.

The process and products of the invention will now be set forth in detail. Raw milk contains various microorganisms, including bacteria, yeast and mold. Raw milk may come into contact with and retain additional microorganisms. The various microorganisms contribute to the degradation of milk, eventually resulting in milk spoilage. Therefor, it is desirable to remove or deactivate the microorganisms. Microorganisms, and particularly bacteria, can be categorized by size and/or heat sensitivity.

Heat resistant bacteria are bacteria which can be deactivated by, for example, heating to a temperature of from at least about 140° C. to about 150° C. for about 4 to about 6 seconds as known to practitioners in the art. This category of bacteria is normally referred to as spores, and includes bacteria of species Bacillus and Clostridium. These bacteria, as defined by their least diameter, are about 0.5 $\mu$m or larger. The smallest heat resistant bacterium identified in milk by the inventor is *Bacillus pumilis*, which has a least diameter of about 0.5 $\mu$m.

Thermoduric bacteria are bacteria which are deactivated by, for example, heating to temperatures of about 100° C. for a few seconds, or equivalent time and temperature combinations as known to practitioners in the art. The smallest thermoduric bacterium identified in milk by the inventor is microbacterium Lacticum, which has a least diameter of about 0.3–0.4 $\mu$m. Thus, these bacteria have a least diameter of about 0.3 $\mu$m or larger.

Heat sensitive bacteria are bacteria which are deactivated by, for example, heating to temperatures as low as about 72° C. to about 75° C. for about 15 to about 20 seconds, or equivalent time and temperature combinations as known to practitioners in the art. The smallest heat sensitive bacterium has a least diameter of less than about 0.3 $\mu$m, while larger heat sensitive bacteria are known to have a least diameter of about 0.5 $\mu$m or greater.

It is desirable to remove or deactivate the above types of bacteria, as well as other microorganisms, in order to prevent degradation of the raw milk and/or resultant milk products.

Raw milk also contains naturally occurring enzymes, as well as extracellular enzymes produced by microorganisms, mainly psychrotrophic bacteria, present in the milk. Certain of these enzymes are known to be bound to somatic cells which typically have a least diameter larger than about 0.5 $\mu$m and are always present in raw milk. The enzymes contribute to the degradation of milk, eventually resulting in milk spoilage. Therefor, it is desirable to remove or deactivate the enzymes.

Given the above information, the inventor herein has formulated a method by which all heat resistant bacteria, most or all thermoduric bacteria, somatic cells, and certain enzymes can be removed from the raw milk portion using filtration. Further, the inventor has formulated a method by which thermoduric bacteria, heat sensitive bacteria and enzymes remaining in the filter permeate can be deactivated. The combination of these methods provides a process by which microorganisms and enzymes are removed or deactivated without noticeably impacting the flavor of the milk, thus providing a sterile and stable fresh-tasting milk fraction having an extended shelf life of at least about one month, preferably at least about two months, and more preferably at least about three months, under ambient conditions. The method of forming a milk fraction according to the invention described herein differs from previously known methods of milk processing in many ways, as will be appreciated by practitioners in the art upon review of this description.

The process of the invention will now be described in detail with reference to FIG. 1.

When the raw milk arrives at the dairy, it is normally at a temperature of from about 4–6° C. The incoming raw milk may be stored in buffer tanks. When the raw milk is to be treated, it is optionally conveyed by a conduit 1 to a separator 2. The separator 2 may be conventional, requiring the raw milk to be heated to a temperature from about 50° C. to about 60° C. Alternatively, the raw milk may not be heated before separation, and a cold separator may be employed at a temperature of from about 4° C. to about 6° C. A cold separator differs in principle from a conventional separator in that the distance between separator panels is slightly greater because cold cream is of a higher viscosity than heated cream. Experiments have demonstrated that a certain, albeit negligible, increased fat content is obtained in the skim milk on separation of raw milk at low temperatures.

The raw milk which enters the dairy through a conduit 1 is separated at a temperature of from about 4° C. to about 60° C. in a separator 2 into a cream fraction 3 and skim milk. Both the cream fraction 3 and skim milk are maintained at a low temperature of from about 4° C. to about 15° C. if a cold separator is used, or at higher temperatures of from about 45° C. to about 60° C. if a conventional separator is employed. Preferably, for ease of production, separation occurs at a temperature of from about 45° C. to about 60° C., most preferably from about 50° C. to about 55° C., although cold separation can be used.

The cream fraction 3 is optionally led to a standardization unit 5 in which it is possible to obtain an exact fat content for re-admixing to the skim milk before filtration, if desired, providing a raw milk portion with the desired fat content for further treatment. Additional cream from conduit 4 may be added as needed. Excess cream may be removed for separate treatment or use.

The cream fraction, or a portion thereof, is treated at unit 6 by heat in order to sterilize the cream. The heat treatment may be by UHT of greater than at least about 135° C. for a period of at least one second, preferably greater than at least about 140° C. for at least 4 seconds, or by an alternate conventional heat treatment method as known by practitioners in the art. For example, the cream fraction may be heated to a temperature of about 121° C. for a period of about one minute. Lower or higher temperatures may also be employed with corresponding adjustments to treatment time, as known to practitioners in the art.

After such treatment, the sterile cream fraction 7 can be reintroduced 14 into the permeate before sterilization (14), after sterilization (14') or before enzyme deactivation (14"), or into the milk fraction (14'''), thus forming sterile standardized milk. The sterile cream fraction 7 is preferably reintroduced into the milk fraction (14').

After separation, the skim milk from the separator 2 can be fed directly to filter 9 or recombined with a portion of the cream fraction to form standardized milk. The skim milk or standardized milk fed to the filter is the raw milk portion 8.

Filtration takes place most effectively if the raw milk portion 8 is at a temperature of from about 45° C. to about 60° C., preferably from about 50° C. to about 55° C. The filter 9 can, for example, be made of ceramic, glass, polymeric fiber, or any other suitable material or combination of material as known to practitioners in the art. Appropriate filter materials and construction will be readily determined by practitioners in the art. The raw milk portion 8 is separated by the filter 9 into a permeate 11 and a retentate 10. Suitable means of filtration are known to practitioners in the art, such as, but not limited to, those disclosed in U.S. Pat. No. 5,256,437, which is incorporated herein by reference, The filter 9 has an effective pore size of about 0.5 $\mu$m or less, meaning that the filter 9 is capable of effectively separating from the permeate all microorganisms, cells, enzymes or other materials which are larger than or equal to 0.5 $\mu$m, including all heat resistant bacteria. Effective separation means a reduction in the number of microorganisms by a factor of at least about $\geq 1,000,000$, or a reduction of about log 6 or greater, in the permeate as compared to the raw milk portion. Preferably, the number of microorganisms present in the permeate, particularly the number of heat resistant bacteria such as *B. Pumilia*, as compared to the raw milk portion is reduced by a factor of at least about log 8, most preferably by at least about log 9.

Trials have shown that a filter 9 with an effective pore size of about 0.5 $\mu$m or less is preferably combined with a subsequent heat treatment at a temperature of from about 90° C. to about 105° C., as described further herein. By a combination of these two treatments, there will be obtained a milk fraction which is sterile.

The effective pore size may not correspond to the actual pore size of the filter. Depending on the filter material or combination of materials selected, the actual pore size of the filter may be larger or smaller than the effective pore size. It is the interaction of the various components of the raw milk portion with the material of the filter which creates the effective pore size, and this will vary for each filter material.

Alternately, the filter 9 has an effective pore size of about 0.3 $\mu$m or less, meaning that the filter 9 is capable of effectively separating from the permeate all microorganisms, cells, or other materials which are equal to or larger than 0.3 $\mu$m in diameter, including all heat resistant bacteria and all thermoduric bacteria. Preferably, the number of microorganisms, particularly the number of thermoduric bacteria such as microbacterium Lacticum, is reduced by a factor of at least about log 8, preferably at least about log 9, most preferably by at least about log 10. Remaining bacteria in the permeate flow are heat sensitive.

Filtration with a filter having an effective pore size of 0.3 $\mu$m or less preferably is combined with a heat treatment of from about 72° C. to about 98° C., as described further herein. This combined treatment produces a sterile milk fraction.

Though a small effective pore size is desirable in order to retain as many undesirable milk components as possible, such as microorganisms, enzymes and the like, too small an effective pore size can be detrimental. If the effective pore size is too small, the pores of the filter can become clogged by the retentate and/or the speed of the flow of milk can be reduced significantly, for example. Other effects will be apparent to practitioners in the art.

Filtration of the raw milk portion as described herein provides a permeate very different from the raw milk portion. The filter removes solids such as somatic cells, microorganisms and enzymes from the raw milk portion. In contrast, the use of heat treatments alone, as known in the art, can deactivate cells, microorganisms and/or enzymes, but does not remove these solids from the milk. Because the permeate of the process described herein is devoid of many of these solids, it is not expected to react to further processing steps such as heating in the same manner as the raw milk portion or milk which is heat treated as known in the art.

Depending upon the filter type, how the filter 9 is constructed or filter efficiency, the filtration may take place in one or more parallel or serial steps. The number of steps desirable depends on various factors known to practitioners in the art, including the total amount of filtered product which comprises the retentate, whether the retentate is to be used, the quality of the raw milk portion and the efficiency which is obtained with filter 9. The retentate can be up to 50% of the raw milk portion. Preferably, the total retentate over all filtrations is less than about 10%, more preferably less than or equal to about 5%, most preferably less than or equal to about 1% of the raw milk portion.

In trials which have been carried out with a filter 9 having an effective pore size of 0.5 μm, the permeate constitutes about 95% of the raw milk portion. The retentate, which constitutes about 5% of the raw milk portion, contains all separated solids with a least diameter $\geq 0.5$ μm.

To obtain a greater yield, the retentate 10 may be led, in a preferred embodiment, from the first filter 9 to a second serial filter (not shown). The second filter is made, for example, of ceramic or any other suitable material known to practitioners in the art and has the same effective pore size or a smaller effective pore size as compared to the first filter 9 Thus, when the first filter has an effective pore size of about 0.5 μm, the second filter has an effective pore size $\leq 0.5$ μm, preferably $\leq 0.3$ μm. The incoming portion of the retentate, in this example about 5% of the total raw milk portion, is divided by the second filter into a second permeate and a second retentate. The second permeate is, in the example, about 4% or greater of the total raw milk portion which entered into the first filter 9.

The retentate from the second filter, which in the example constitutes less than about 1% of the total raw milk portion, contains all microorganisms, cells, enzymes and the like which are $\geq 0.5$ μm, preferably $\geq 0.3$ μm, which have been separated from the raw milk portion by the first filter and from the first retentate by the second filter. The retentate from the second filter is led off and, in a preferred embodiment, not employed in the production of a stable, sterile milk fraction according to the invention.

Practitioners will recognize the above percentages for a first and second retentate are exemplary only, and the total amount of retentate may be as much as about 50%, preferably less than about 10%, more preferably less than or equal to about 5%, and most preferably less than or equal to about 1%, of the raw milk portion.

Additional filters which cooperate correspondingly may also be used so that the retentate from the second filter is led to a third filter, and so on. However, because retentate from the second filter preferably constitutes a very small portion of the total raw milk portion, preferably less than about 10%, more preferably less than about 5%, most preferably less than about 1%, additional filters are not expected to increase the permeate yield to any appreciable degree.

First, second, third, etc. filters may also be present each in parallel. For example, the raw milk portion may be divided into two or more streams so that each raw milk portion stream is directed to a separate filter of $\leq 0.5$ μm effective pore size, preferably $\leq 0.3$ μm, effective pore size. The secondary filtration of the retentate(s) using a filter of the same or smaller effective pore size may also be accomplished by directing all or a portion of the retentate from the first filtration to one or more second filters of the same or smaller effective pore size as the first filter. The second retentate(s) can be filtered again as many times as desired or needed with the final retentate(s) preferably being discarded.

It is noted that serial and/or parallel filtration of the raw milk portion and resulting permeate can also be performed in a like manner to the serial and/or parallel filtration of the retentate as described above. In the case of serial filtration, the first filter has an effective pore size of 0.5 μm as less, and each subsequent filter has an effective pore size equal to or less than that of the first filter. Preferably, each subsequent filter has an effective pore size smaller than that of the previous filter.

The permeates from the serial and/or parallel filters are combined into a single permeate 11. The permeate 11 desirably contains no microorganisms which are larger than about 0.5 μm, in particular no heat resistant bacteria, and more preferably no microorganisms which are larger than about 0.3 μm, in particular, no heat resistant or thermoduric bacteria. Any microorganisms remaining in the permeate are deactivated by heat treatment in order to render a sterile milk fraction.

The permeate 11 from the one or more filters is directed to heat treatment equipment 12 which may consist of a conventional plate heat exchanger or other method of heating as known to practitioners in the art. Because all heat-resistant bacteria are removed by filtration with a filter having an effective pore size of about 0.5 μm or less, and all heat resistant and thermoduric bacteria are removed by filtration with a filter having an effective pore size of about 0.3 μm or less, lower heat treatments than normally applied in the art can be used to deactivate remaining microorganisms and enzymes, thus obtaining a sterile milk fraction.

The permeate flow 11 is sterilized in the heat treatment equipment 12 at from about 78° C. to about 121° C. Preferably, when the filter pore size is about $\leq 0.5$ μm, the permeate flow is subjected to a heat treatment of from about 90° C. to about 105° C., and even more preferably from about 95° C. to about 99° C. When the filter pore size is about $\leq 0.3$ μm, the permeate flow preferably is subjected to a heat treatment of from about 78° C. to about 98° C., more preferably from about 78° C. to about 85° C. The length of the heat treatment may be determined based on the temperature by practitioners in the art, but is typically conducted in about 1 minute or less, preferably about 30 seconds or less, more preferably about 15 seconds or less, even more preferably 10 seconds or less, and most preferably about 5 seconds or less. This treatment results in a sterile permeate 13 with a much improved flavor. However, the shelf life of the sterile permeate under ambient conditions is limited.

Therefore, the sterile permeate 13 undergoes stabilization 15 by heat treatment at temperatures of from about 50° C. to about 121° C., preferably from about 55° C. to about the sterilization temperature. Stabilization can occur at or near the temperature of sterilization, from about 78° C. to about 121° C., preferably from about 95° C. to about 99° C., for a period of from about 1 second to about 30 seconds, most preferably from about 79° C. to about 95° C. for a period of from about 5 seconds to about 30 seconds. Alternatively, sterilization can occur from about 60° C. to about 78° C. for a time interval of from about 1 second to about 15 minutes, preferably from about 4 seconds to about 5 minutes. The heating takes place in holding cells, such as, but not limited to, tubes or pipes which can be used to conduct the sterile permeate from one treatment to the next, for example. Other suitable holding devices as known to practitioners in the art can also be used. The time required for treatment is dependent on the temperature chosen and the quality of the raw milk, and will readily be determined by practitioners in the art.

After stabilizing the sterile permeate, the sterile, stable permeate undergoes enzyme deactivation 16 to further improve the stability of the resultant milk fraction. Enzyme deactivation is achieved by heating the sterile, stable permeate at temperatures of from about 50° C. to about 78° C., preferably from about 60° C. to about 65° C., for a period of from about 30 seconds to about 15 minutes, preferably from about 1 minute to about 10 minutes. The time required for treatment is dependent on the temperature chosen and the quality of the raw milk, and will be readily determined by practitioners in the art.

In order for enzyme deactivation to occur, the permeate must previously have been heated to at least about 78° C. This heating breaks chemical bonds in the enzymes, allowing them to unfold upon heating at a lower temperature, resulting in less enzymatic activity or enzyme deactivation. If the milk is not first heated to at least about 78° C., permanent deactivation of the enzymes will not occur and long term stability of the resultant milk fraction in the order of months under ambient conditions will not be achieved.

It should be noted that while the terms sterilization, stabilization and enzyme deactivation have been assigned to different heating steps herein for ease of identification and discussion of each heating step, the individual terms are not completely accurate in describing what occurs in each step. As known to practitioners in the art, each enzyme or bacterium has a different temperature at which it becomes permanently deactivated. Thus, although the main purpose of the sterilization step is to deactivate remaining thermoduric and/or heat sensitive bacteria after filtration, it is possible that some enzymes are also deactivated by the heat of sterilization. It is also possible that some thermoduric bacteria survive the heat of sterilization, though most likely in a weakened state. It is theorized that the heating step of stabilization, alone or in combination with the heating step of enzyme deactivation, will deactivate any thermoduric bacteria which survive sterilization due to the combined temperature effects over time. The step of stabilization is intended to permanently deactivate enzymes weakened or unfolded in whole or in part by the heat of sterilization. However, other enzymes are deactivated by the heat of stabilization, or are weakened, allowing permanent deactivation to occur in the enzyme deactivation step. Thus, enzyme deactivation occurs in all three steps to some degree, although it is theorized the majority of enzymes, particularly proteases, require all three heating steps for complete and permanent deactivation, and deactivation of bacteria may occur in one or more of sterilization, stabilization and enzyme deactivation, but primarily occurs during sterilization.

Figure 2:
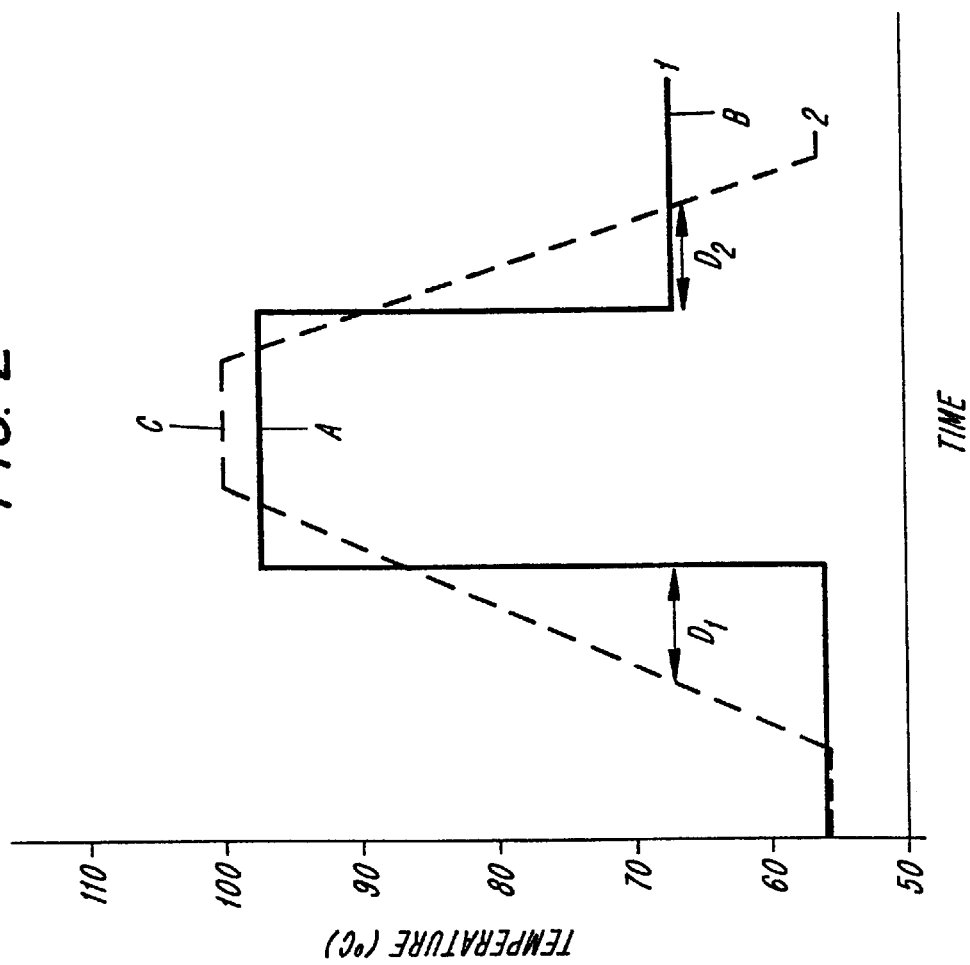

The separate steps of sterilization and stabilization, or stabilization and enzyme deactivation, can, in effect, be combined. If sterilization is achieved by direct heating, a separate stabilization step will be required. However, if sterilization is achieved by indirect heating, the indirect heating in effect encompasses the step of stabilization, and therefore a separate stabilization heating can be omitted if desired. This is demonstrated in FIG. 2. When direct heating represented by curve 1 is used, sterilization is indicated as portion A and stabilization is indicated as portion D. When indirect heating represented by curve 2 is used, sterilization is indicated as portion C. and stabilization is indicated as portions $D_1$ and $D_2$. It can be seen from FIG. 2 that indirect heating achieves a stabilization period of $D_1+D_2$. The stabilization period $D_1+D_2$ combined with the higher heat of sterilization in indirect heating achieves the same effect as the direct heating using a lower heat of sterilization and longer period of stabilization at a lower temperature. Thus, with the use of indirect heating for sterilization, a shorter stabilization step, or no separate stabilization step, may be utilized to provide the same stability as in direct heating, but with a different result in flavor.

The stabilization and enzyme deactivation steps can be combined as one extended heating step at a single temperature. This is equivalent to two separate heating steps performed at the same temperature for two equivalent or different periods of time, or at different temperatures for varying lengths of time. For example, the following three hypothetical heat treatments shown in Table 1 result in the same stabilization and enzyme deactivation effect when applied to a sterilized permeate, although the flavor of the resultant milk fraction is different, with the flavor of Example 3 being better than that of Example 1 or 2.

TABLE 1

| Example | Stabilization | Enzyme Deactivation |
| --- | --- | --- |
| 1 | <65° C. for 10 minutes> | |
| 2 | 65° C. for 3 minutes | 65° C. for 7 minutes |
| 3 | 68° C. for 1 minute | 60° C. for 5 minutes |

Practitioners skilled in the art will recognize that several combinations of heat and temperature can be used to achieve a given desired effect.

Figure 3:
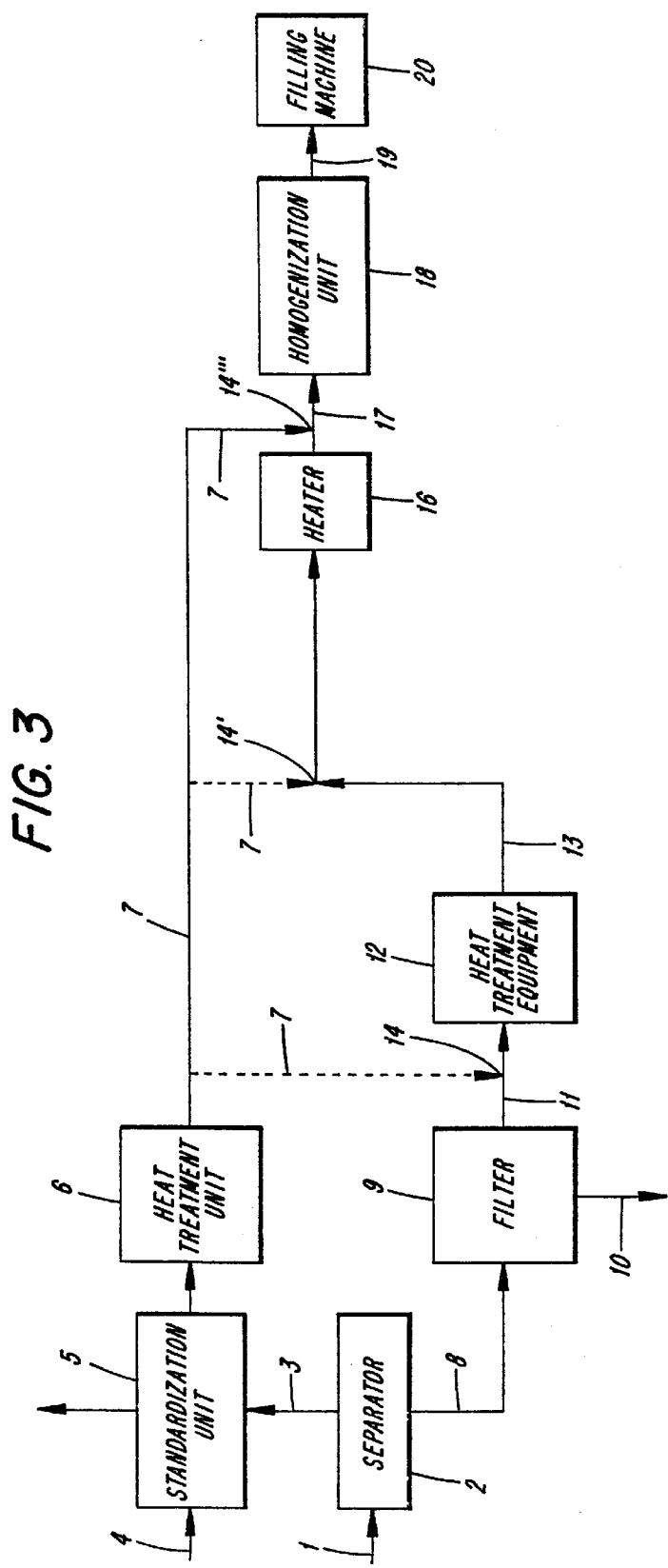
Figure 4:
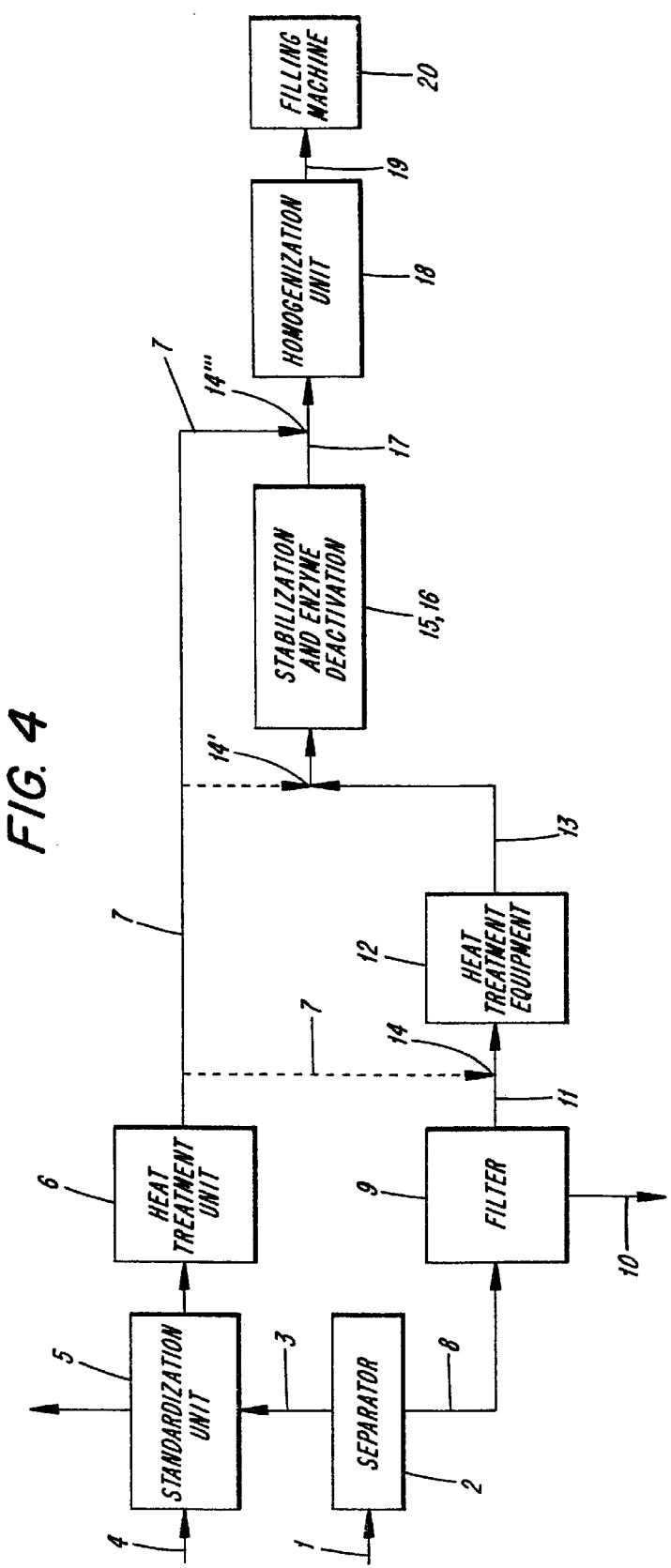

Thus, as shown in FIG. 1, the invention can include a separate sterilization 12, stabilization 15 and enzyme deactivation 16 step. Alternately, as shown in FIG. 3, if indirect heating is used in the sterilization step 12, only a distinct enzyme deactivation step 16 is necessary, although the short, distinct stabilization step (not shown) may optionally be included before enzyme deactivation. If direct heating is used in the sterilization step 12, as shown in FIG. 4, it is possible to combine stabilization 15 and enzyme deactivation 16 into one longer heating step, or the steps can remain separate and distinct.

Figure 5:
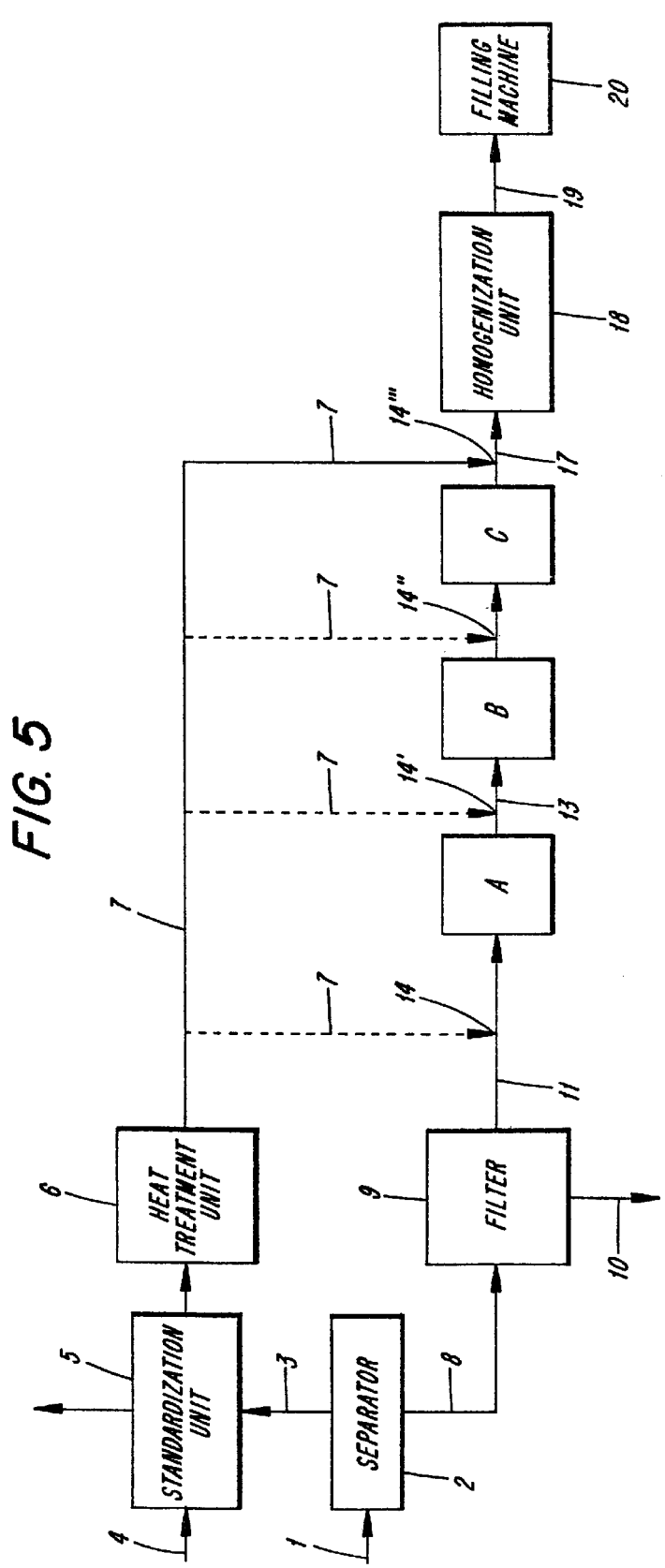

The combination of heating steps to achieve sterilization, stabilization and enzyme deactivation may alternately be explained with reference to FIG. 5. After filtration 9, heating steps A, B and C. are conducted to achieve a sterile, stable milk product before homogenization 18. These steps have time and temperature parameters as shown in Table 2.

TABLE 2

|  | A (Sterilization) | B (Stabilization) | C (Enzyme Deactivation) |
| --- | --- | --- | --- |
| Temperature | 78° C.–121° C. | 50° C.–121° C. | 50° C.–78° C. |
| Time | about ≦1 min. | about 1 sec. to about 15 mins. | about 1 sec. to about 15 mins. |

Step B, stabilization, can be combined with sterilization step A by the use of indirect heating, or with enzyme deactivation step C. by proper selection of a single temperature and length of time for treatment of the sterilized permeate.

Returning to FIG. 1, the resultant milk fraction 17 is remixed 14 with the sterile and stable cream fraction as needed, if this has not already occurred in the processing stream, to form a milk product. The milk fraction and cream fraction, if necessary, are combined so as to achieve a milk product with a desired fat content. For example, whole milk, 2%, 1%, 1/2% or skimmed milk may be produced in this manner. When the milk product is to be drinking milk, it is preferably homogenized 18.

Homogenization 18 is carried out in order to obtain a milk product where the fat globules are reduced to small fat globules of approximately equal size. If the milk product is not homogenized, a cream precipitation will occur, i.e., the fat globules accumulate in the upper region of the finished packaged milk product. Almost all drinking milk is homogenized today.

The homogenized milk product 19 optionally is conveyed to one or more filling machines 20 which are preferably aseptic. The milk product is then packaged in containers, preferably aseptic, which may be distributed and stored at room temperature. The treated milk product is stable under ambient conditions for periods of at least one month, preferably at least two months, most preferably at least three months or longer, without loss or change of flavor, texture or odor. If refrigerated, the shelf life of the milk product is exponentially longer, about 1 year or greater.

The milk fraction described herein will remain free of microorganisms and maintain a reduced level of protein fractions, such as amino-N, for periods of at least one month, preferably at least two months, most preferably at least three months or longer when stored under ambient conditions. It has been determined by taste tests in sensitive individuals that an amino-N content of about 30 mg/L is detectable as a sour or rancid taste in milk stored in glass containers, which have no effect on the taste of the milk, when compared to fresh, pasteurized milk, Thus, at the end of a desired storage period, preferably at least one month, more preferably at least two months, and most preferably at least three months, the amino-N content of the milk fraction should be less than about 30 mg/L, preferably less than about 25 mg/L, as determined with fluorescamine by methods known to practitioners in the art and described in Chism, et al. *J. of Dairy Science* 62:1798–1800 (1979), and in Rollema et al. *Milchwissenschaft* 44(8) (1989), both of which are hereby incorporated by reference.

The milk fraction described herein comprises more than about 50% of the raw milk portion, preferably more than about 90%, more preferably more than about 95%, and most preferably more than about 99% of the raw milk portion, and is sterile, stable and extremely pure. It contains no heat resistant bacteria and little or no thermoduric bacteria. Further, it contains very few deactivated heat sensitive bacteria or enzymes compared to raw milk. Enzymes, particularly proteases, are largely removed with somatic cells or deactivated. The deactivated microorganisms and enzymes present in the milk fraction constitute a small percentage of those microorganisms which initially existed in the raw milk. The milk fraction and milk products containing the milk fraction desirably have a shelf life of at least one month, preferably at least two months, most preferably at least three months under ambient conditions. Stability is determined by the amino-N content at the end of the desired shelf life under ambient conditions.

It is theorized that the length of time at which the milk product is held at a particular temperature is more important in achieving good flavor of milk than the temperature to which the milk is heated. Thus, it is more desirable to heat the permeate to a high temperature for a short time to sterilize it and hold the sterile permeate for a longer period at a lower temperature, preferably no higher than about 65° C., than to hold the permeate longer at a high temperature for sterilization and hold the sterile permeate for less time at a lower temperature. For example, if a permeate is held to about 98° C. for 2 seconds, then at about 65° C. for 5 minutes, it will have a long shelf life under ambient conditions and a good flavor. In contrast, if the permeate is held initially to about 98° C. for 14 seconds and then at about 60° C. for 2 minutes, it will have the same shelf life, but an undesirable, more cooked flavor.

The required time at the lower temperature will depend on the quality of the filter feed, the ambient storage conditions and required shelf life. The method described herein makes it possible to adapt the milk treatments so as to produce a milk product with a specified shelf life while maintaining the best possible flavor.

While not wishing to be bound by theory, the inventor believes the order of heating, i.e., higher temperature before lower temperature, as well as the length of heating at a particular temperature is more critical than the actual temperature used because a first heating above 78° C., even for a short period of time, will kill the heat sensitive microorganisms present in the permeate and deactivate or kill many or all of the thermoduric bacteria, while a longer period at a lower temperature is necessary in order to achieve stabilization and denaturation of enzymes.

As will be apparent from the foregoing description, the present invention realizes a method of producing a sterile and stable milk product for storage under ambient conditions. The milk product is extremely pure because the milk fraction therein does not contain the quantity of killed or inactivated microorganisms, enzymes or somatic cells which UHT or heat treated sterile milk normally contains. In all embodiments, because the milk is exposed to heating treatments which are considerably lower in temperature than conventional UHT treatments, the milk has improved flavor properties, and the flavor can be compared with the flavor of pasteurized milk.

Practitioners in the art will recognize that the size of the filter, number of filtrations, and the time and temperature of sterilization, stabilization and enzyme deactivation steps will depend on the number of microorganisms present in the raw milk. For example, raw milk with a higher percentage of microorganisms may require one or more filtrations, or a higher temperature or longer period of time during sterilization, stabilization and/or enzyme deactivation.

EXAMPLES

Skim milk was treated according to the above-described method as follows. The skim milk was subjected to filtration 9 with a filter having a pore size as indicated in Table 3 below. After filtration, the permeate 11 was sterilized by heat treatment 12 for the time and at the temperature indicated in Table 3. The sterilized permeate 13 was stabilized and underwent enzyme deactivation in one or two steps by heat treatment 15 and/or 16 for the time(s) and at the temperature (s) specified in the table. The results of six separate treatments and the conditions under which the permeate was treated are set forth in Table 3 below. All milk products were sterile and stable for at least 6 weeks.

Stability of the milk product as shown in Table 3 was measured by the amount of amino-N in the milk product after a period of 6 to 12 weeks (as specified in table) under ambient conditions (40° C.). The amount of amino-N is measured as described below and as set forth by Chism, et al. in *Dairy Science* 62:1798–1800 (1979), and by Rollema et al. in *Milchwissenschaft* 44(8) (1989), both of which are hereby incorporated by reference.

Determination of Free Amino-N in Milk with Fluorescamine

The following reagents were used:

| | |
|---|---|
| Trichloroacetic acid (TCA) | 30% in water |
| Boric acid (buffer) | Prepared by adding 6.3 g to 900 ml water, adjusting the pH to 9.4 with 40% NAOH, and adding water to 1 liter. |
| Fluram (Fluorescamine) | 0.070 g/200 ml acetone (free of water) |

Calibration was performed using a stock solution of D,L-alanine, 0.318 g/100 ml water. Samples were prepared by adding 5.0 ml TCA to 10.0 ml milk. The mixture was shaken well and stored for 1 hour at room temperature then filtered (size indicated in table). The clear filtrate was used for derivation. Standard solutions were prepared in the same manner in the following proportions:

| Stock solution (ml) | Water (ml) | mg amino-N/L |
|---|---|---|
| 2.0 | add 100 | 10 |
| 4.0 | add 100 | 20 |
| 6.0 | add 100 | 30 |
| 8.0 | add 100 | 40 |
| 10.0 | add 100 | 50 |

Derivation was performed using 0.050 ml filtrate, to which 3.0 ml of buffer and 1.5 ml fluram was added. The mixture was shaken vigorously and immediately measured by a fluorescence spectrophotometer. Excitation was measured at 390 nm, and emission was measured at 475 nm.

TABLE 3

| Example | Filtration (pore size) | Sterilization (heat/time) | Stabilization (heat/time) | Enzyme Deactivation (heat/time) | Amount of amino-N (mg/L) after number of weeks at 40° C. |
|---|---|---|---|---|---|
| 1 | Effective pore size 0.5 $\mu$m | 95° C./4 sec | 95° C./3 sec | 65° C./5 min | 25 mg/L at 12 wks |
| 2 | Effective pore size 0.5 $\mu$m | 98° C./2 sec | 98° C./12 sec | 65° C./1 sec | 26 mg/L at 12 wks |
| 3 | Effective pore size 0.5 $\mu$m | 98° C./2 sec | <65° C./2 min> | | 28 mg/L at 12 wks |
| 4 | Effective pore size 0.3 $\mu$m | 85° C./2 sec | 85° C./24 sec | 65° C./10 min | 28 mg/L at 12 wks |
| 5 | Effective pore size 0.3 $\mu$m | 85° C./2 sec | 85° C./11 sec | 65° C./10 min | 28 mg/L at 8 wks |
| 6 | Effective pore size 0.3 $\mu$m | 85° C./2 sec | 85° C./11 sec | 65°/5 min | 30 mg/L at 6 wks |

The milk fractions resulting from the processes shown in Table 3 were subjected to taste testing by a group of people sensitive to amino-N content. It was found that the flavor of each milk fraction was different based on the process used, and the milk fractions were rated as having good or desirable flavor as follows. For milk subjected to 0.5 $\mu$m filtration (Examples 1–3), testers rated the milk from best to worst taste as 3-1-2. For milk subjected to 0.3 $\mu$m filtration (Examples 4–6), testers rated the milk from best to worst taste as 6-5-4. This illustrates the importance of maintaining the milk at a lower temperature for as long as possible in order to achieve both a desirable stability for storage under ambient conditions and a good flavor.

While the invention has been described with reference to preferred embodiments, it is to be understood that variations and modifications can be resorted to as will be apparent to those skilled in the art. Such variations and modifications are considered to be within the purview and scope of the invention as defined by the claims appended hereto.

What is claimed is:

1. A process for forming a stable, sterile milk fraction for storage under ambient conditions comprising:
   filtering a raw milk portion to form a permeate;
   sterilizing the permeate at a temperature of from about 72° C. to about 121° C. to form a sterile permeate;
   stabilizing the sterile permeate by heating to a temperature of from about 50° C. to about 121° C. to form a sterile, stable permeate; and
   deactivating enzymes in the sterile, stable permeate by heating to a temperature of from about 50° C. to about 78° C. to form a sterile, stable milk fraction.

2. The process of claim 1, wherein said sterilizing occurs for a period of time of about 1 minute or less.

3. The process of claim 1, wherein said sterilizing is by direct heating or indirect heating.

4. The process of claim 3, wherein said sterilizing is by indirect heating.

5. The process of claim 4, wherein said stabilizing occurs during said sterilizing.

6. The process of claim 1, wherein said stabilizing occurs for a period of time of from about 1 second to about 15 minutes.

7. The process of claim 1, wherein said stabilizing occurs at the same temperature as said sterilizing.

8. The process of claim 1, wherein said stabilizing and said deactivating enzymes occur at the same temperature as one step.

9. The process of claim 1, wherein said deactivating enzymes occurs for a period of time of from about 1 second to about 15 minutes.

10. The process of claim 1, wherein said deactivating enzymes occurs at a lower temperature than said stabilizing.

11. The process of claim 1, wherein said filtering comprises passing the raw milk portion through at least one filter having an effective pore size of about 0.5 $\mu$m or less.

12. The process of claim 11, wherein there is more than one filter in parallel and the permeate of each filter is combined for said sterilizing.

13. The process of claim 11, wherein there is more than one filter aligned in serial, and wherein a first serial filter has an effective pore size of about 0.5 $\mu$m or less and a subsequent serial filter has the same or smaller effective pore size than the first serial filter, and wherein the permeate of the first serial filter is passed through the subsequent serial filter to form a second permeate, and the second permeate is subjected to said sterilizing.

14. The process of claim 13, wherein the subsequent serial filter has an effective pore size of about 0.3 µm or less.

15. The process of claim 11, wherein said sterilizing the permeate occurs at a temperature of from about 90° C. to about 105° C.

16. The process of claim 11, wherein the permeate is free of all heat resistant bacteria.

17. The process of claim 1, wherein said filtering comprises passing the raw milk portion through at least one filter having an effective pore size of about 0.3 µm or less.

18. The process of claim 17, wherein there is more than one filter in parallel and the permeate of each filter is combined for said sterilizing.

19. The process of claim 17, wherein there is more than one filter aligned in serial, and wherein a first serial filter has an effective pore size of about 0.3 µm or less and a subsequent serial filter has the same or smaller effective pore size than the first serial filter, and wherein the permeate of the first serial filter is passed through the subsequent serial filter to form a second permeate, and the second permeate is subjected to said sterilizing.

20. The process of claim 19, wherein the subsequent serial filter has an effective pore size smaller than that of the first serial filter.

21. The process of claim 17, wherein said sterilizing the permeate occurs at a temperature of from about 78° C. to about 98° C.

22. The process of claim 17, wherein the permeate is free of all heat resistant and thermoduric bacteria.

23. The process of claim 1, wherein said filtering reduces the number of microorganisms in the permeate as compared to the raw milk portion by a factor of at least about log 6.

24. The process of claim 1, wherein said filtering reduces the number of microorganisms in the permeate as compared to the raw milk portion by a factor of at least about log 8.

25. A stable, sterile milk fraction made by the process of claim 1.

26. The stable, sterile milk fraction of claim 25, having a shelf life of at least about two months under ambient conditions.

27. The stable, sterile milk fraction of claim 25, having a shelf life of at least about three months under ambient conditions.

28. The stable, sterile milk fraction of claim 25, having a shelf life of at least about one year when stored at from about 4° C. to about 80 C.

29. The stable, sterile milk fraction of claim 25, having an amino-N content after a specified storage period of about 30 mg/L or less.

30. A stable, sterile milk product comprising the milk fraction of claim 25.

31. The stable, sterile milk product of claim 30, wherein the stable, sterile milk product is a consumer beverage with a fat content of at least about 0.05%.

32. The stable, sterile milk product of claim 30, having a shelf life of at least about 2 months under ambient conditions.

33. The stable, sterile milk product of claim 30, having a shelf life of at least about 3 months under ambient conditions.

34. The stable, sterile milk product of claim 30, having a shelf life of at least about one year when stored at from about 4° C. to about 8° C.

35. A process for forming a stable, sterile milk product comprising:

separating raw milk into a cream fraction and a raw milk portion;

heating the cream fraction at a temperature of at least about 121° C. to form a sterile cream fraction;

filtering the raw milk portion to form a permeate;

sterilizing the permeate at a temperature of from about 72° C. to about 121° C. to form a sterile permeate;

stabilizing the sterile permeate at a temperature of from about 50° C. to about 121° C. to form a sterile, stable permeate;

deactivating enzymes in the sterile, stable permeate at a temperature of from about 50° C. to about 78° C. to form a milk fraction;

combining the sterile cream fraction with one or more of the permeate; sterile permeate; sterile, stable permeate; or the milk fraction;

wherein the milk fraction or milk fraction after combination with the sterile cream fraction is the stable, sterile milk product.

36. The process of claim 35, wherein the milk product is further homogenized.

37. The process of claim 35, wherein said filtering uses one or more filter having an effective pore size of about 0.5 µm or less.

38. The process of claim 37, wherein said filtering removes all heat resistant bacteria.

39. The process of claim 37, wherein said sterilizing the permeate is at a temperature of from about 90° C. to about 105° C.

40. The process of claim 35, wherein said filtering uses one or more filter having an effective pore size of about 0.3 µm or less.

41. The process of claim 40, wherein said filtering removes all heat resistant and thermoduric bacteria.

42. The process of claim 35, wherein said sterilizing the permeate is at a temperature of from about 72° C. to about 98° C.

43. The process of claim 35, wherein the number of microorganisms in the permeate are reduced when compared to the number of microorganisms in the raw milk portion by a factor of at least about log 6.

44. The process of claim 35, wherein the number of microorganisms in the permeate are reduced when compared to the number of microorganisms in the raw milk portion by a factor of at least about log 8.

45. The process of claim 35, wherein the sterile cream fraction is combined with the milk fraction.

46. A stable, sterile milk product made by the process of claim 35.

47. The stable, sterile milk product of claim 46, having a shelf life of at least about two months under ambient conditions.

48. The stable, sterile milk product of claim 46, having a shelf life of at least about three months under ambient conditions.

49. The stable, sterile milk product of claim 46, having a shelf life of at least about one year when stored at from about 4° C. to about 8° C.

50. The stable, sterile milk product of claim 46, having an amino-N content after a specified storage period of about 30 mg/L or less.

* * * * *